US012612331B2

(12) United States Patent
Kim

(10) Patent No.: US 12,612,331 B2
(45) Date of Patent: Apr. 28, 2026

(54) WINDOW AND DISPLAY DEVICE HAVING THE SAME

(71) Applicant: SAMSUNG DISPLAY CO., LTD., Yongin-si (KR)

(72) Inventor: Sungwoo Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 441 days.

(21) Appl. No.: 18/313,156

(22) Filed: May 5, 2023

(65) Prior Publication Data

US 2023/0365461 A1      Nov. 16, 2023

(30) Foreign Application Priority Data

May 10, 2022      (KR) ........................ 10-2022-0056980

(51) Int. Cl.
*C03C 17/34*          (2006.01)
*C03C 17/36*          (2006.01)
*C03C 17/42*          (2006.01)

(52) U.S. Cl.
CPC ...... *C03C 17/3435* (2013.01); *C03C 17/3681* (2013.01); *C03C 17/42* (2013.01); *C03C 2217/213* (2013.01); *C03C 2217/281* (2013.01); *C03C 2217/77* (2013.01)

(58) Field of Classification Search
None
See application file for complete search history.

(56) References Cited

U.S. PATENT DOCUMENTS

| | | | |
|---|---|---|---|
| 9,110,230 B2 | 8/2015 | Koch, III et al. | |
| 9,335,444 B2 | 5/2016 | Hart et al. | |
| 9,359,261 B2 | 6/2016 | Bellman et al. | |
| 9,726,786 B2 | 8/2017 | Hart et al. | |
| 10,168,459 B2 | 1/2019 | Ockenfuss | |
| 10,436,945 B2 | 10/2019 | Hart et al. | |
| 11,236,013 B2 | 2/2022 | Bluck et al. | |
| 2014/0335330 A1* | 11/2014 | Bellman ................ | G02B 1/113 |
| | | | 428/428 |
| 2020/0018872 A1* | 1/2020 | Fujii ..................... | C23C 16/466 |
| 2021/0122671 A1 | 4/2021 | Hart et al. | |
| 2022/0024815 A1 | 1/2022 | Kim et al. | |

FOREIGN PATENT DOCUMENTS

| | | |
|---|---|---|
| KR | 10-1633245 | 6/2016 |
| KR | 10-1642672 | 7/2016 |
| KR | 10-1756610 | 7/2017 |
| KR | 10-1781768 | 9/2017 |
| KR | 10-2017-0133740 | 12/2017 |
| KR | 10-1950564 | 2/2019 |
| KR | 10-1982428 | 5/2019 |

(Continued)

*Primary Examiner* — David Sample
(74) *Attorney, Agent, or Firm* — F. CHAU & ASSOCIATES, LLC

(57)          ABSTRACT

A window includes a base layer, a plurality of nitride layers disposed on the base layer, a plurality of oxide layers disposed on the base layer, and a protective layer disposed on the nitride layers and the oxide layers. The nitride layers are alternately stacked with the oxide layers on the base layer, and a sum of thicknesses of the nitride layers and thicknesses of the oxide layers is equal to or greater than about 500 nm and equal to or smaller than about 900 nm.

15 Claims, 5 Drawing Sheets

(56)          References Cited

FOREIGN PATENT DOCUMENTS

| KR | 10-2047915 | 11/2019 |
|----|-------------|---------|
| KR | 10-2020-0031679 | 3/2020 |
| KR | 10-2020-0072216 | 6/2020 |
| KR | 10-2144038 | 8/2020 |
| KR | 10-2020-0106878 | 9/2020 |
| KR | 10-2188706 | 12/2020 |
| KR | 10-2242510 | 4/2021 |

* cited by examiner

WINDOW AND DISPLAY DEVICE HAVING THE SAME

CROSS-REFERENCE TO RELATED APPLICATIONS

This U.S. non-provisional patent application claims priority under 35 U.S.C. § 119 to Korean Patent Application No. 10-2022-0056980, filed on May 10, 2022, the disclosure of which is hereby incorporated by reference in its entirety.

TECHNICAL FIELD

Embodiments of the present disclosure relate to a window and a display device having the same. More particularly, embodiments of the present disclosure relate to a window having a low reflectance and excellent mechanical characteristics, and a display device having the window.

DISCUSSION OF RELATED ART

Display devices that provide images to a user are utilized in various multimedia devices, such as, for example, a television set, a mobile phone, a tablet computer, a game unit, etc. In recent years, various types of flexible display devices that are foldable or bendable have been developed. The shape of the flexible display device is able to be changed in various ways. For example, the flexible display device may be foldable, rollable, or bendable, and thus, convenience when carrying the flexible display device may be increased.

The flexible display device may include a display panel and a window, which are foldable or bendable.

SUMMARY

Embodiments of the present disclosure provide a window having a low reflectance and excellent mechanical characteristics.

Embodiments of the present disclosure provide a display device having a low reflectance and increased display efficiency.

Embodiments of the present disclosure provide a window including a base layer, a plurality of nitride layers disposed on the base layer, a plurality of oxide layers disposed on the base layer, and a protective layer disposed on the nitride layers and the oxide layers. The nitride layers are alternately stacked with the oxide layers on the base layer, and a sum of thicknesses of the nitride layers and thicknesses of the oxide layers is equal to or greater than about 500 nm and equal to or smaller than about 900 nm.

In an embodiment, each of the nitride layers includes $Si_3N_4$, and each of the oxide layers includes $SiO_2$.

In an embodiment, the nitride layers have a refractive index greater than a refractive index of the oxide layers.

In an embodiment, the nitride layers include first, second, third, fourth, and fifth nitride layers, the oxide layers include first, second, third, fourth, and fifth oxide layers, and the first nitride layer, the first oxide layer, the second nitride layer, the second oxide layer, the third nitride layer, the third oxide layer, the fourth nitride layer, the fourth oxide layer, the fifth nitride layer, and the fifth oxide layer are sequentially stacked on the base layer.

In an embodiment, a sum of thicknesses of the first to fifth nitride layers is smaller than about 500 nm.

In an embodiment, a maximum value of thicknesses of the first to fifth nitride layers is smaller than about 300 nm.

In an embodiment, the protective layer is in contact with an upper surface of the fifth oxide layer.

In an embodiment, the fifth oxide layer has a thickness equal to or greater than about 75 nm and equal to or smaller than about 100 nm.

In an embodiment, the window further includes an intermediate layer disposed between the protective layer and the fifth oxide layer, and the intermediate layer includes columnar $SiO_2$.

In an embodiment, each of the first to fifth oxide layers includes planar $SiO_2$.

In an embodiment, the intermediate layer has a thickness equal to or greater than about 10 nm and equal to or smaller than about 30 nm.

In an embodiment, the protective layer includes a polymer including fluorine.

In an embodiment, the base layer includes a glass substrate or a polymer substrate.

In an embodiment, the protective layer has a thickness equal to or greater than about 10 nm and equal to or smaller than about 40 nm.

Embodiments of the present disclosure provide a window including a base layer, first, second, third, fourth, and fifth nitride layers disposed on the base layer, first, second, third, fourth, and fifth oxide layers disposed on the base layer, and a protective layer disposed on the first to fifth nitride layers and the first to fifth oxide layers. The first nitride layer, the first oxide layer, the second nitride layer, the second oxide layer, the third nitride layer, the third oxide layer, the fourth nitride layer, the fourth oxide layer, the fifth nitride layer, and the fifth oxide layer are sequentially stacked on the base layer.

In an embodiment, the first to fifth nitride layers include $Si_3N_4$, and the first to fifth oxide layers include $SiO_2$.

Embodiments of the present disclosure provide a display device including a display module and a window disposed on the display module. The window includes a base layer disposed on the display module, a plurality of nitride layers disposed on the base layer, a plurality of oxide layers disposed on the base layer, and a protective layer disposed on the nitride layers and the oxide layers. The nitride layers are alternately stacked with the oxide layers on the base layer, and a sum of thicknesses of the nitride layers and thicknesses of the oxide layers is equal to or greater than about 500 nm and equal to or smaller than about 900 nm.

In an embodiment, each of the nitride layers includes $Si_3N_4$, and each of the oxide layers includes $SiO_2$.

In an embodiment, the nitride layers include first, second, third, fourth, and fifth nitride layers, the oxide layers include first, second, third, fourth, and fifth oxide layers, and the first nitride layer, the first oxide layer, the second nitride layer, the second oxide layer, the third nitride layer, the third oxide layer, the fourth nitride layer, the fourth oxide layer, the fifth nitride layer, and the fifth oxide layer are sequentially stacked on the base layer.

In an embodiment, the display device further includes an intermediate layer disposed between the protective layer and the fifth oxide layer, and the intermediate layer includes columnar $SiO_2$.

According to embodiments of the present disclosure, as the window includes the nitride layers and the oxide layers, a reflectance of the window may be reduced, and a mechanical strength of the window are increased.

According to embodiments of the present disclosure, a display efficiency and durability of the display device are increased.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1A:
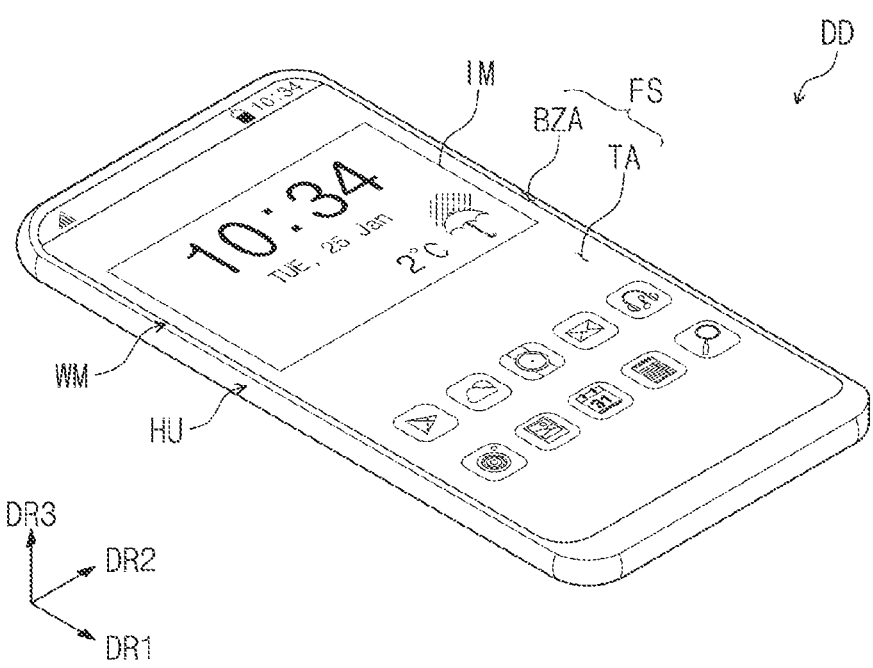
FIG. 1A is an assembled perspective view of a display device according to an embodiment of the present disclosure.

Embodiments of the present disclosure will be described more fully hereinafter with reference to the accompanying drawings. Like reference numerals may refer to like elements throughout the accompanying drawings.

It will be understood that when an element such as a film, a region, a layer, etc., is referred to as being "on", "connected to", "coupled to", or "adjacent to" another component, it can be directly on, connected, coupled, or adjacent to the other element, or intervening elements may be present. It will also be understood that when an element is referred to as being "between" two elements, it can be the only element between the two elements, or one or more intervening elements may also be present. It will also be understood that when an element is referred to as "covering" another element, it can be the only element covering the other element, or one or more intervening elements may also be covering the other element. Other words used to describe the relationships between elements should be interpreted in a like fashion.

It will be further understood that when an element is referred to as being "directly connected" to another element, there are no intervening elements present between the two elements. For example, the term "directly connected" may mean that two layers or two members are disposed without employing an additional adhesive member therebetween.

As used herein, the term "and/or" may include any and all combinations of one or more of the associated listed items.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

Figure 1B:
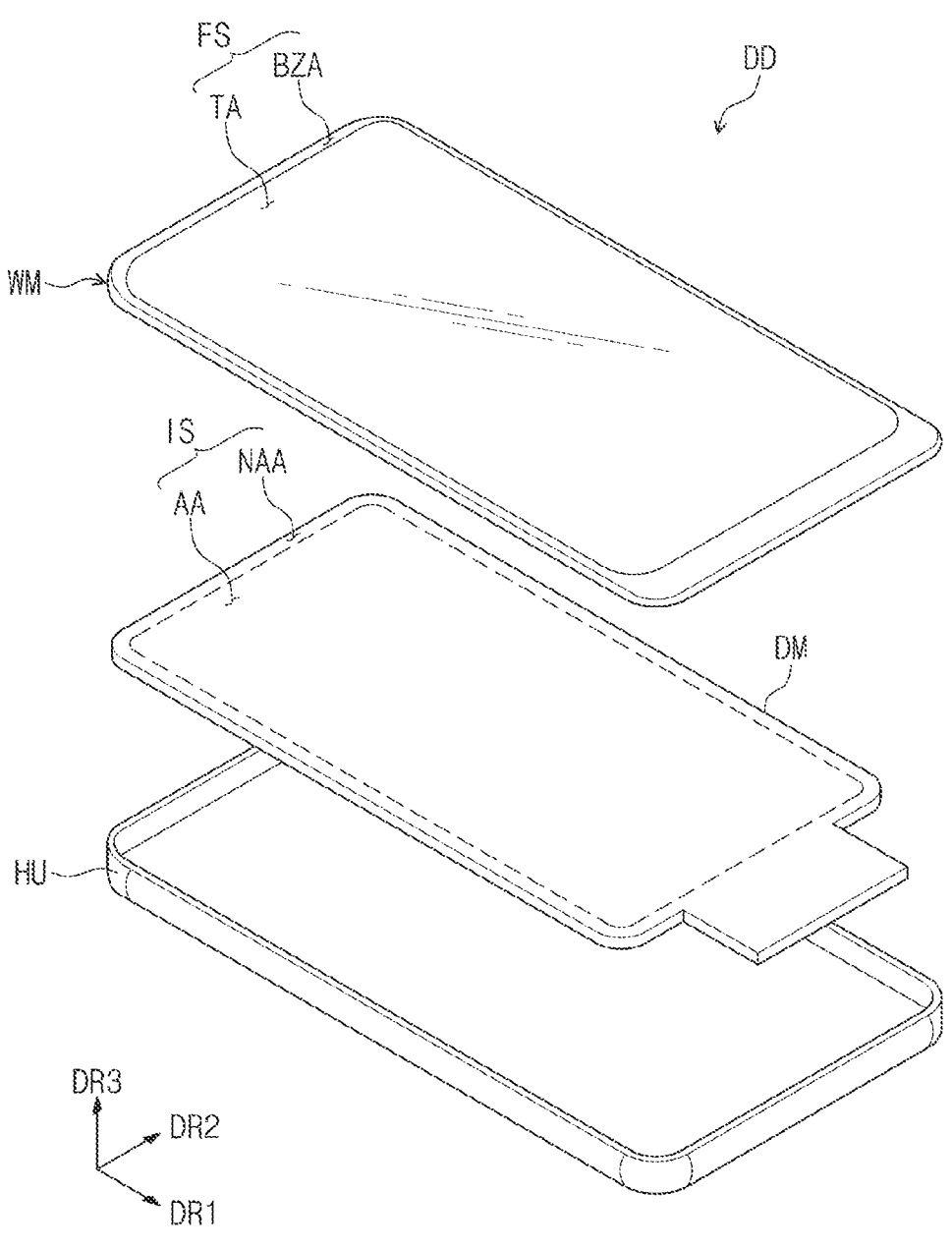
FIG. 1B is an exploded perspective view of a display device according to an embodiment of the present disclosure.

FIG. 1A is an assembled perspective view of a display device DD according to an embodiment of the present disclosure. FIG. 1B is an exploded perspective view of the display device DD according to an embodiment of the present disclosure.

Referring to FIG. 1A, the display device DD may be activated in response to electrical signals. The display device DD may display an image IM and may sense an external input. The display device DD may be utilized in various embodiments. For example, the display device DD may be utilized in a tablet computer, a notebook computer, a computer, or a smart television. Herein, for convenience of explanation, a smartphone will be described as a representative example of the display device DD. However, the display device DD is not limited thereto.

The display device DD may display the image IM through a display surface FS, which is substantially parallel to each of a first direction DR1 and a second direction DR2, toward a third direction DR3. The third direction DR3 may also be referred to as a thickness direction of the display device DD. The display surface FS through which the image IM is displayed may correspond to a front surface of the display device DD and a front surface FS of a window WM. Hereinafter, referring to the display surface FS, the front surface of the display device DD and the front surface of the window WM will be assigned with the same reference numeral. The image IM may include a video as well as a still image. FIG. 1A shows a clock widget and application icons as a representative example of the image IM. However, the image IM is not limited thereto.

In an embodiment, front (or upper) and rear (or lower) surfaces of each member of the display device DD may be defined with respect to a direction in which the image IM is displayed. The front and rear surfaces may be disposed opposite to each other in the third direction DR3, and a normal line direction of each of the front and rear surfaces may be substantially parallel to the third direction DR3. A separation distance in the third direction DR3 between the front surface and the rear surface of the each member may correspond to a thickness in the third direction DR3 of the each member. Directions indicated by the first, second, and third directions DR1, DR2, and DR3 are relative to each other, and thus, the directions indicated by the first, second, and third directions DR1, DR2, and DR3 may be changed to other directions. In the following descriptions, the expression "when viewed in a plane or in a plane" may mean a state of being viewed in the third direction DR3.

The display device DD may sense a user input applied thereto from outside of the display device DD. The user input may include inputs of various forms, such as, for example, a part of a user's body, light, heat, or pressure. The user input may be provided in various ways. The display device DD may sense the user input applied to a side surface or a rear surface of the display device DD according to a structure of the display device DD. However, the present disclosure is not limited thereto.

Referring to FIGS. 1A and 1B, the display device DD may include the window WM, a display module DM, and an external case HU. In an embodiment, the window WM and the external case HU may be coupled to each other to provide an appearance of the display device DD. In an embodiment, the external case HU, the display module DM, and the window WM may be sequentially stacked in the third direction DR3.

The window WM may include an optically transparent material. The window WM may include an insulating panel. For example, the window WM may include a glass material, a plastic material, or a combination thereof.

The front surface FS of the window WM may define the front surface of the display device DD as described above. A transmissive area TA may be an optically transparent area. For example, the transmissive area TA may be an area having a visible light transmittance of about 90% or more.

A bezel area BZA may be an area having a relatively lower transmittance as compared to the transmissive area TA. The bezel area BZA may define a shape of the transmissive area TA. The bezel area BZA may be disposed adjacent to the transmissive area TA and may surround the transmissive area TA.

The bezel area BZA may have a predetermined color. The bezel area BZA may cover a peripheral area NAA of the display module DM. As a result of this configuration, in an embodiment, the peripheral area NAA may be prevented from being viewed from outside of the display device DD, or the visibility of the peripheral area NAA from the outside of the display device DD may be decreased. However, this is merely an example, and the bezel area BZA may be omitted from the window WM according to an embodiment of the present disclosure.

The display module DM may display the image IM and may sense the external input. The image IM may be displayed through a front surface IS of the display module DM. The front surface IS of the display module DM may include an active area AA and the peripheral area NAA. The active area AA may be an area that is activated in response to electrical signals.

In an embodiment, the active area AA may be an area where the image IM is displayed and the external input is be sensed. The transmissive area TA may overlap at least the active area AA. For example, the transmissive area TA may overlap an entire surface of the active area AA or at least a portion of the active area AA. Accordingly, a user may view the image IM or may provide the external input through the transmissive area TA. However, this is merely an example, and embodiments of the present disclosure are not limited to this configuration. For example, according to an embodiment, an area through which the image IM is displayed and an area through which the external input is sensed may be separated from each other in the active area AA.

The peripheral area NAA may be covered by the bezel area BZA. The peripheral area NAA may be disposed adjacent to the active area AA. The peripheral area NAA may surround the active area AA. A driving circuit or a driving line that drives the active area AA may be disposed in the peripheral area NAA.

The display module DM may include the display panel and a sensor layer.

The image IM may be substantially displayed through the display panel, and the external input may be substantially sensed by the sensor layer. As the display module DM includes the display panel and the sensor layer, the display module DM may display the image IM while sensing the external input. This will be described in further detail below.

The display device DD may further include a driving circuit. The driving circuit may include a flexible circuit board and a main circuit board. The flexible circuit board may be electrically connected to the display module DM. The flexible circuit board may connect the display module DM to the main circuit board. However, this is merely an example. For example, according to an embodiment, the flexible circuit board is not connected to the main circuit board, and the flexible circuit board may be a rigid substrate.

The flexible circuit board may be connected to pads of the display module DM, which are disposed in the peripheral area NAA. The flexible circuit board may provide electrical signals to the display module DM to drive the display module DM. The electrical signals may be generated by the flexible circuit board or the main circuit board. The main circuit board may include various driving circuits that drive the display module DM or a connector that provide a power. The main circuit board may be connected to the display module DM through the flexible circuit board.

FIG. 1B shows an unfolded state of the display module DM as a representative example. However, at least a portion of the display module DM may be bent. In an embodiment, a portion of the display module DM may be bent toward a rear surface of the display module DM, and the portion that is bent toward the rear surface may be a portion connected to the main circuit board. Accordingly, the main circuit board may be assembled while overlapping the rear surface of the display module DM.

The external case HU may be coupled to the window WM to define the appearance of the display device DD. The external case HU may provide a predetermined inner space. The display module DM may be accommodated in the inner space.

The external case HU may be formed of a material with a relatively high rigidity. For example, the external case HU may include a glass, plastic, or metal material, or a plurality of frames and/or plates or combinations thereof. The external case HU may stably protect the components of the display device DD, which are accommodated in the inner space, from external impact.

Figure 2:
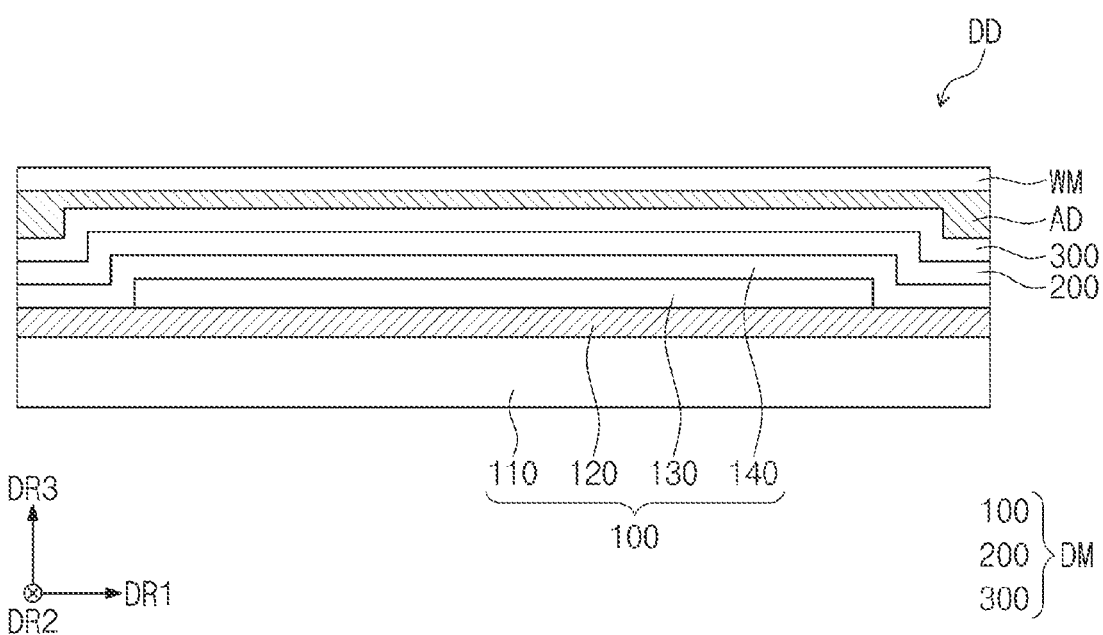
FIG. 2 is a cross-sectional view of a display device according to an embodiment of the present disclosure.

FIG. 2 is a cross-sectional view of the display device DD according to an embodiment of the present disclosure.

Referring to FIG. 2, the display device DD may include the display module DM and the window WM. The display module DM may be coupled to the window WM by an adhesive layer AD. The display module DM of the display device DD may include a display panel 100, a sensor layer 200, and an anti-reflective layer 300. Among the layers of the display module DM, the anti-reflective layer 300 may be coupled to the window WM by the adhesive layer AD.

The display panel 100 may have a configuration that substantially generates the image. The display panel 100 may be a light emitting type display panel. For example, the display panel 100 may be an organic light emitting display panel, an inorganic light emitting display panel, a micro-LED display panel, or a nano-LED display panel. The display panel 100 may also be referred to as a display layer.

The display panel 100 may include a base substrate 110, a circuit layer 120, a light emitting element layer 130, and an encapsulation layer 140.

The base substrate 110 may be a member that provides a base surface on which the circuit layer 120 is disposed. The base substrate 110 may be a flexible substrate that is bendable, foldable, or rollable. The base substrate 110 may be, for example, a glass substrate, a metal substrate, or a polymer substrate. However, the base substrate 110 is not limited thereto. According to embodiments, the base substrate 110 may be an inorganic layer, an organic layer, or a composite material layer.

The base substrate 110 may have a multi-layer structure. For example, the base substrate 110 may include a first synthetic resin layer, an inorganic layer having a single-layer or multi-layer structure, and a second synthetic resin layer disposed on the inorganic layer. Each of the first and second synthetic resin layers may include a polyimide-based resin. However, the present disclosure is not limited thereto.

The circuit layer 120 may be disposed on the base substrate 110. The circuit layer 120 may include, for example, an insulating layer, a semiconductor pattern, a conductive pattern, and a signal line.

The light emitting element layer 130 may be disposed on the circuit layer 120. The light emitting element layer 130 may include a light emitting element. As an example, the light emitting element may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from, for example, moisture, oxygen, and a foreign substance such as dust particles. The encapsulation layer 140 may include at least one inorganic layer. The encapsulation layer 140 may include a stack structure of an inorganic layer/organic layer/inorganic layer.

The sensor layer 200 may be disposed on the display panel 100. The sensor layer 200 may sense an external input applied thereto from outside of the display device DD. The external input may be the user input. The user input may include inputs of various forms, such as, for example, a part of the user's body, light, heat, pen, or pressure.

The sensor layer 200 may be formed on the display panel 100 through successive processes. In this case, the sensor layer 200 may be disposed directly on the display panel 100. In the present disclosure, the expression "the sensor layer 200 is disposed directly on the display panel 100" means that no intervening elements are present between the sensor layer 200 and the display panel 100. That is, when the sensor layer 200 is disposed directly on the display panel 100, a separate adhesive member is not disposed between the sensor layer 200 and the display panel 100. Similar expressions with reference to other components should be interpreted in a like fashion, unless the context clearly indicates otherwise.

The anti-reflective layer 300 may be disposed directly on the sensor layer 200. The anti-reflective layer 300 may reduce a reflectance with respect to the external light incident on the display device DD from outside of the display device DD. The anti-reflective layer 300 may be formed on the sensor layer 200 through successive processes. The anti-reflective layer 300 may include color filters. The color filters may be arranged in a predetermined arrangement. The arrangement of the color filters may be determined by taking into account colors of lights emitted from pixels included in the display panel 100. In addition, the anti-reflective layer 300 may further include a black matrix disposed adjacent to the color filters. The anti-reflective layer 300 will be described in further detail below.

According to an embodiment, the sensor layer 200 may be omitted. In this case, the anti-reflective layer 300 may be disposed directly on the display panel 100. According to an embodiment, positions of the sensor layer 200 and the anti-reflective layer 300 may be changed with each other.

According to an embodiment, the display device DD may further include an optical layer disposed on the anti-reflective layer 300. As an example, the optical layer may be formed on the anti-reflective layer 300 through successive processes. The optical layer may control a direction of a light incident from the display panel 100, which may increase a front luminance of the display device DD. As an example, the optical layer may include an organic insulating layer through which openings are defined to respectively correspond to light emitting areas of the pixels included in the display panel 100 and a high refractive index layer covering the organic insulating layer and filled in the openings. The high refractive index layer may have a refractive index higher than that of the organic insulating layer.

The window WM may provide the front surface of the display device DD.

The window WM may include, for example, a glass, tempered glass, or polymer film as its base layer. The window WM may further include functional layers such as an anti-reflective layer or an anti-fingerprint layer. In an embodiment, the window WM may further include a bezel pattern overlapping the bezel area BZA (refer to FIG. 1B).

Figure 3:
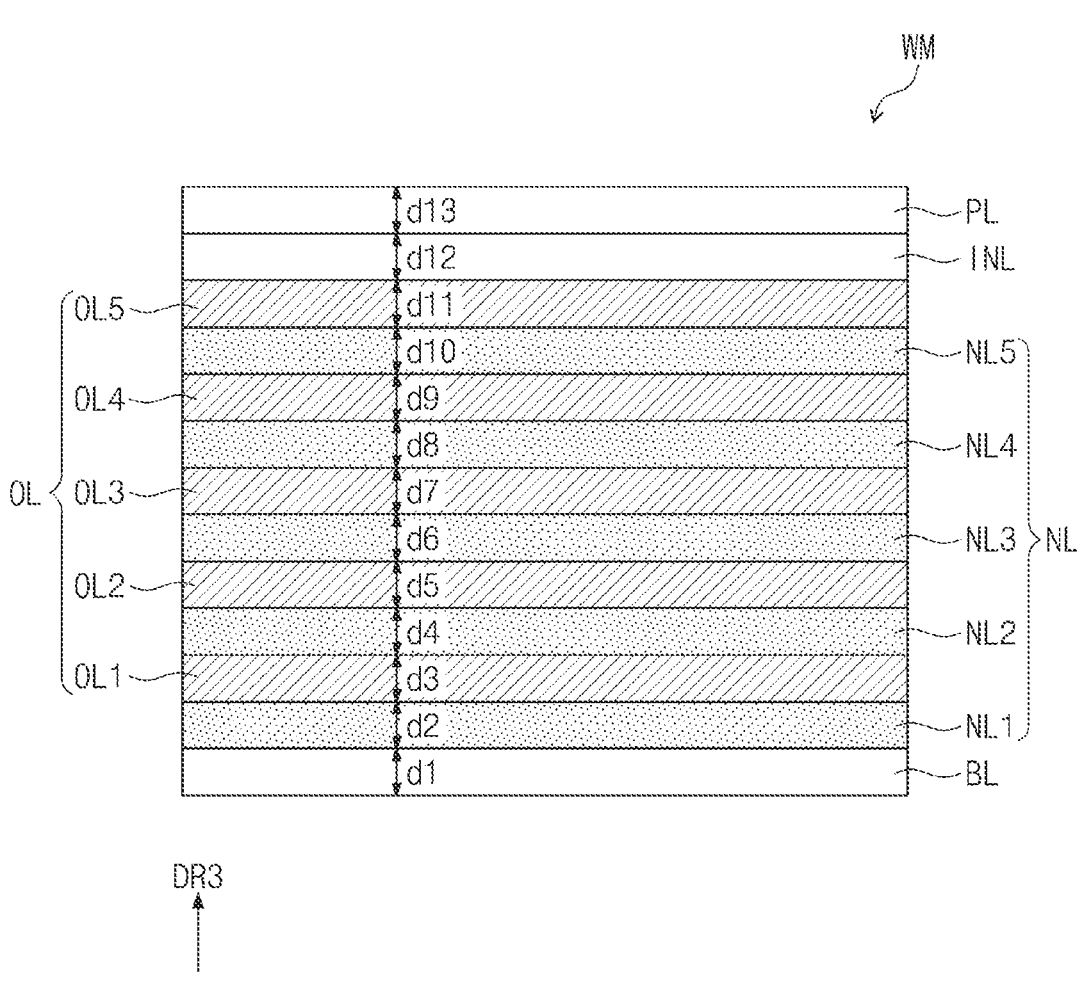
FIG. 3 is a cross-sectional view of a window according to an embodiment of the present disclosure.
Figure 4:
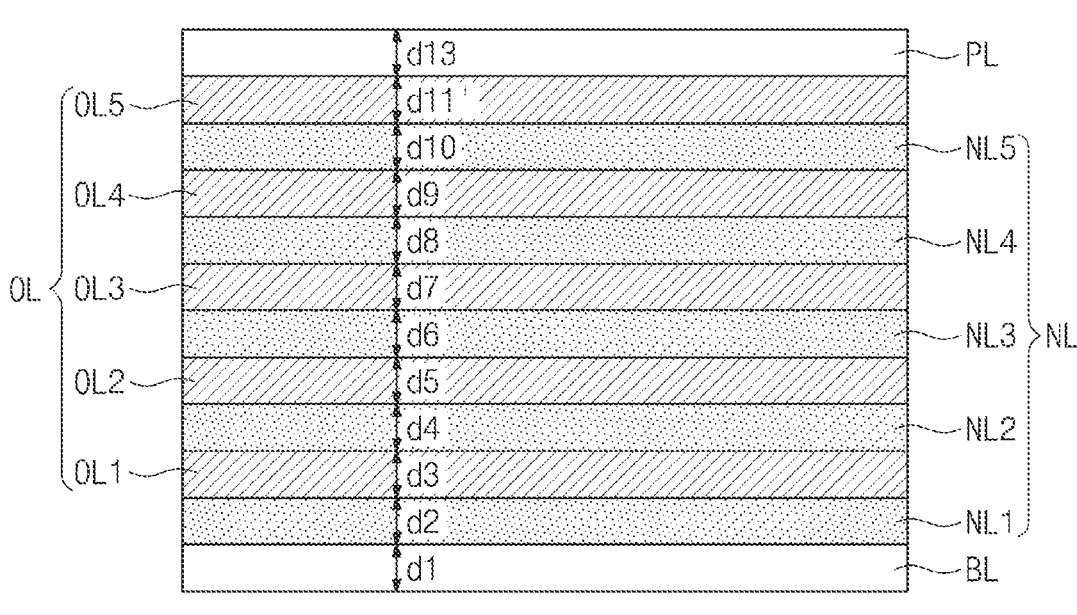
FIG. 4 is a cross-sectional view of a window according to an embodiment of the present disclosure.

FIG. 3 is a cross-sectional view of the window WM according to an embodiment of the present disclosure. FIG. 4 is a cross-sectional view of a window WM-1 according to an embodiment of the present disclosure.

Referring to FIG. 3, the window WM may include a base layer BL, a nitride layer NL, an oxide layer OL, and a protective layer PL. The window WM may further include an intermediate layer INL disposed under the protective layer PL.

The base layer BL may include a transparent material. The base layer BL may include, for example, a glass, tempered glass, or polymer film. The base layer BL may be a glass substrate that is chemically tempered. In a case where the base layer BL is a chemically tempered glass substrate, the base layer BL may have a high mechanical strength while having a thin thickness, and thus, the base layer BL may be used as a window of a foldable display device. In a case where the base layer BL is a polymer film, the base layer BL may include a polyimide (PI) film or a polyethylene terephthalate (PET) film. The base layer BL of the window WM may have a single-layer or multi-layer structure. As an example, the base layer BL may have a structure in which multiple polymer films are coupled to each other by an adhesive member, or may have a structure in which the glass substrate is coupled to the polymer film by an adhesive. The base layer BL may include a flexible material.

The base layer BL may have a thickness $d1$ equal to or greater than about 20 μm and equal to or smaller than about 60 μm. In an embodiment, the thickness $d1$ of the base layer BL may be equal to or greater than about 20 μm and equal to or smaller than about 40 μm. FIGS. 3 and 4 show the base layer BL having a rectangular shape as a representative example. However, the shape of the base layer BL is not limited thereto. For example, according to an embodiment, the base layer BL may have a shape in which an edge of an upper surface of the base layer BL is rounded. For example, in an embodiment, the edge of the upper surface of the base layer BL, which overlaps the bezel area BZA (refer to FIG. 1B) may be rounded.

The nitride layer NL and the oxide layer OL may be disposed on the base layer BL. The nitride layer NL and the oxide layer OL may be deposited on the base layer BL by a physical vapor deposition (PVD) such as, for example, a sputtering process, a chemical vapor deposition (CVD), or an atomic layer deposition (ALD). However, the method of forming the nitride layer NL and the oxide layer OL is not limited thereto.

The nitride layer NL may include $Si_3N_4$, and the oxide layer OL may include $SiO_2$. The nitride layer NL may have a first refractive index, and the oxide layer OL may have a second refractive index smaller than the first refractive index. The second refractive index may be smaller than the first refractive index. The first refractive index may be equal to or greater than about 1.8 with respect to a light with a wavelength of about 550 nm, and the second refractive index may be equal to or greater than about 1.3 and equal to or smaller than about 1.6 with respect to the light with the wavelength of about 550 nm.

Each of the nitride layer NL and the oxide layer OL may be provided in plural. The nitride layers NL may include first, second, third, fourth, and fifth nitride layers NL1, NL2, NL3, NL4, and NL5, and the oxide layers OL may include first, second, third, fourth, and fifth oxide layers OL1, OL2, OL3, OL4, and OL5.

In an embodiment, the first, second, third, fourth, and fifth nitride layers NL1, NL2, NL3, NL4, and NL5 may be alternately stacked with the first, second, third, fourth, and fifth oxide layers OL1, OL2, OL3, OL4, and OL5 on the base layer BL. The nitride layer NL may be in contact with the upper surface of the base layer BL. As an example, the first nitride layer NL1, the first oxide layer OL1, the second nitride layer NL2, the second oxide layer OL2, the third nitride layer NL3, the third oxide layer OL3, the fourth nitride layer NL4, the fourth oxide layer OL4, the fifth nitride layer NL5, and the fifth oxide layer OL5 may be sequentially stacked on the base layer BL along the third direction DR3.

As the first, second, third, fourth, and fifth nitride layers NL1, NL2, NL3, NL4, and NL5 are alternately stacked with the first, second, third, fourth, and fifth oxide layers OL1, OL2, OL3, OL4, and OL5, which have different refractive indices from each other, a surface reflectance of the window WM may be reduced.

In an embodiment, the surface reflectance of the window WM may be defined as a ratio of a light reflected from the window WM to the outside of the display device DD to a light incident into the window WM from the outside of the display device DD. The light reflected to the outside of the display device DD may include a specular reflected light that is reflected at the same angle after being incident, and a diffuse reflected light that is scattered and reflected in various directions. In an embodiment, a reflectance may be defined as a specular component included (SCI) reflectance. The surface reflectance may be a reflectance at the front surface.

In an embodiment, the first, second, third, fourth, and fifth nitride layers NL1, NL2, NL3, NL4, and NL5 have thicknesses d2, d4, d6, d8, and d10, respectively, each being equal to or greater than about 8 nm and equal to or smaller than about 325 nm.

In an embodiment, the first, second, third, fourth, and fifth nitride layers NL1, NL2, NL3, NL4, and NL5 have different thicknesses. As an example, the thickness d2 of the first nitride layer NL1 may be equal to or greater than about 9 nm and equal to or smaller than about 11 nm. The thickness d4 of the second nitride layer NL2 may be equal to or greater than about 27 nm and equal to or smaller than about 33 nm. The thickness d6 of the third nitride layer NL3 may be equal to or greater than about 243 nm and equal to or smaller than about 299 nm. The thickness d8 of the fourth nitride layer NL4 may be equal to or greater than about 41 nm and equal to or smaller than about 51 nm. The thickness d10 of the fifth nitride layer NL5 may be equal to or greater than about 128 nm and equal to or smaller than about 157 nm. However, the thicknesses d2, d4, d6, d8, and d10 of the first, second, third, fourth, and fifth nitride layers NL1, NL2, NL3, NL4, and NL5 are not limited thereto. As the first, second, third, fourth, and fifth nitride layers NL1, NL2, NL3, NL4, and NL5 have different thicknesses from each other, the surface reflectance of the window WM may be reduced.

In an embodiment, A sum of the thicknesses d2, d4, d6, d8, and d10 of the first, second, third, fourth, and fifth nitride layers NL1, NL2, NL3, NL4, and NL5 satisfies a value smaller than about 500 nm. In a case where the sum of the thicknesses d2, d4, d6, d8, and d10 of the first, second, third, fourth, and fifth nitride layers NL1, NL2, NL3, NL4, and NL5 is equal to or greater than about 500 nm, a total thickness of the window WM may increase, and thus, a total thickness of the display device DD may increase excessively.

In an embodiment, a maximum value among the thicknesses d2, d4, d6, d8, and d10 of the first, second, third, fourth, and fifth nitride layers NL1, NL2, NL3, NL4, and NL5 is smaller than about 300 nm.

As the window WM includes the nitride layer NL, the window WM may have a high rigidity. Since the window WM has the structure in which the first, second, third, fourth, and fifth nitride layers NL1, NL2, NL3, NL4, and NL5 each having a thickness smaller than about 300 nm are alternately stacked with the first, second, third, fourth, and fifth oxide layers OL1, OL2, OL3, OL4, and OL5, the high rigidity property of the window WM may be distributed throughout the entire layer rather than being concentrated in only a specific layer. Accordingly, the rigidity of an entire area of the window WM may be increased.

In an embodiment, the first, second, third, fourth, and fifth oxide layers OL1, OL2, OL3, OL4, and OL5 have thicknesses d3, d5, d7, d9, and d11, respectively, each being equal to or greater than about 9 nm and equal to or smaller than about 83 nm. In an embodiment, the first, second, third, fourth, and fifth oxide layers OL1, OL2, OL3, OL4, and OL5 have different thicknesses. As an example, the thickness d3 of the first oxide layer OL1 may be equal to or greater than about 37 nm and equal to or smaller than about 46 nm. The thickness d5 of the second oxide layer OL2 may be equal to or greater than about 16 nm and equal to or smaller than about 20 nm. The thickness d7 of the third oxide layer OL3 may be equal to or greater than about 10 nm and may be equal to or smaller than about 13 nm. The thickness d9 of the fourth oxide layer OL4 may be equal to or greater than about 17 nm and may be equal to or smaller than about 22 nm. The thickness d11 of the fifth oxide layer OL5 may be equal to or greater than about 61 nm and equal to or smaller than about 76 nm. However, the thicknesses d3, d5, d7, d9, and d11 of the first, second, third, fourth, and fifth oxide layers OL1, OL2, OL3, OL4, and OL5 are not limited thereto. As the first, second, third, fourth, and fifth oxide layers OL1, OL2, OL3, OL4, and OL5 have different thicknesses from each other, the surface reflectance of the window WM may be reduced.

In an embodiment, the first, second, third, fourth, and fifth nitride layers NL1, NL2, NL3, NL4, and NL5 have thicknesses different from those of the first, second, third, fourth, and fifth oxide layers OL1, OL2, OL3, OL4, and OL5.

Referring to the window WM according to an embodiment of the present disclosure, the first, second, third, fourth, and fifth nitride layers NL1, NL2, NL3, NL4, and NL5 having the first refractive index are alternately stacked with the first, second, third, fourth, and fifth oxide layers OL1, OL2, OL3, OL4, and OL5 having the second refractive index, and the first, second, third, fourth, and fifth nitride layers NL1, NL2, NL3, NL4, and NL5 have thicknesses different from those of the first, second, third, fourth, and fifth oxide layers OL1, OL2, OL3, OL4, and OL5. Thus, the surface reflectance of the window WM may be reduced.

According to an embodiment, a sum of the thicknesses d2, d3, d4, d5, d6, d7, d8, d9, d10, and d11 of the nitride layer NL and the oxide layer OL is within a range equal to or greater than about 500 nm and equal to or smaller than about 900 nm. In a case where the sum of the thicknesses d2, d3, d4, d5, d6, d7, d8, d9, d10, and d11 of the nitride layer NL and the oxide layer OL is smaller than about 500 nm, the strength of the window WM may be reduced. In a case where the sum of the thicknesses d2, d3, d4, d5, d6, d7, d8, d9, d10, and d11 of the nitride layer NL and the oxide layer OL is greater than about 900 nm, the total thickness of the window WM may increase, and thus, the total thickness of the display device DD may increase excessively.

The protective layer PL may be disposed on the nitride layer NL and the oxide layer OL.

The protective layer PL may be disposed at an uppermost position of the window WM. An upper surface of the protective layer PL may correspond to the display surface FS (refer to FIG. 1A). The protective layer PL may improve a slip property and an anti-scratch property of the window WM. According to an embodiment, the protective layer PL may be an anti-fingerprint layer that has an excellent anti-fingerprint property and that may suppress surface abrasion.

The protective layer PL may include a fluorine-containing polymer. The protective layer PL may include, for example, a perfluoropolyether (PFPE) compound. The protective layer PL may include, for example, perfluoropolyether silane, perfluoroalkylether alkoxysilane, or perfluoroalkylether copolymer. As the protective layer PL may include a perfluoropolyether (PFPE) compound, the anti-fingerprint properties and the anti-scratch properties of the protective layer PL may increase.

The protective layer PL may have a thickness d13 equal to greater than about 10 nm and equal to or smaller than about 40 nm, and as an example, the thickness d13 may be equal to greater than about 20 nm and equal or smaller than about 30 nm. In a case where the thickness d13 of the protective layer PL is smaller than about 10 nm, the anti-fingerprint property and the anti-scratch property of the window WM may be reduced. In a case where the thickness d13 of the protective layer PL is greater than about 40 nm, the total thickness of the window WM may increase, and thus, the total thickness of the display device DD may increase excessively.

The protective layer PL may be formed by a method using, for example, an E-beam, thermal evaporation, etc. However, the method of forming the protective layer PL is not limited thereto.

The intermediate layer INL may be disposed under the protective layer PL. The intermediate layer INL may increase an adhesion between the protective layer PL and the fifth oxide layer OL5. The intermediate layer INL may be an adhesion promoter layer that has an excellent adhesion property with respect to each of the protective layer PL and the fifth oxide layer OL5 and increases a mutual adhesion between the protective layer PL and the fifth oxide layer OL5. The intermediate layer INL may be disposed directly on the fifth oxide layer OL5.

The intermediate layer INL may include a material that increases adhesion while having good mechanical strength and a low refractive property. The intermediate layer INL may include, for example, $SiO_2$, e.g., columnar $SiO_2$. The first, second, third, fourth, and fifth oxide layers OL1, OL2, OL3, OL4, and OL5 may include planar $SiO_2$. A packing density of columnar $SiO_2$ may correspond to about 60% to about 100% of a packing density of planar $SiO_2$. Accordingly, the adhesion of the intermediate layer INL including columnar $SiO_2$ with respect to the protective layer PL may increase when compared to that of the intermediate layer INL including planar $SiO_2$.

The intermediate layer INL may have a thickness d12 equal to or greater than about 10 nm and equal to or smaller than about 30 nm. In a case where the thickness d12 of the intermediate layer INL is smaller than about 10 nm, sufficient adhesion may not be secured between the fifth oxide layer OL5 and the protective layer PL. In a case where the thickness d12 of the intermediate layer INL is greater than about 30 nm, the reflectance of the window WM may increase, and the total thickness of the display device DD may increase due to the increase of the total thickness of the window WM.

The intermediate layer INL may be formed by a method using, for example, an E-beam, a thermal evaporation, a sputtering process, etc. However, the method of forming the intermediate layer INL is not limited thereto.

The window WM may have an average surface reflectance of about 3% or less with respect to a light with a wavelength equal to or greater than about 400 nm and equal to or smaller than about 700 nm. For example, the average surface reflectance of the window WM may be equal to or smaller than about 1% with respect to a light with a wavelength of about 550 nm. The window WM may have an average transmittance of about 92% or more with respect to the light with a wavelength equal to or greater than about 400 nm and equal to or smaller than about 700 nm. For example, the average transmittance of the window WM may be about 93% or more with respect to the light with a wavelength of about 550 nm.

The window WM may have a color shift (ΔE) equal to or smaller than about 2.

The window WM may have a maximum value of a surface hardness equal to or greater than about 11 GPa. In the present disclosure, the surface hardness of the window WM is measured by the Berkovich indenter hardness test along an indentation depth of about 50 nm or more on the surface of the window WM.

It is to be understood that the window WM is not limited to the structure shown in FIG. 3.

Referring to FIG. 4, in an embodiment, the window WM-1 does not include the intermediate layer INL (refer to FIG. 3).

The window WM-1 may include a base layer BL, a nitride layer NL, an oxide layer OL, and a protective layer PL. The nitride layer NL, the oxide layer OL, and the protective layer PL may be disposed on the base layer BL. The above descriptions of the nitride layer NL and the oxide layer OL with reference to FIG. 3 may be applied to the nitride layer NL and the oxide layer OL of FIG. 4, and for convenience of explanation, a further description thereof is omitted.

In the window WM-1, the protective layer PL may be disposed directly on a fifth oxide layer OL5. In this case, the fifth oxide layer OL5 may have a thickness d11' equal to or greater than about 75 nm and equal to or smaller than about 100 nm, and, for example, the thickness d11' of the fifth oxide layer OL5 may be equal to or greater than about 79 nm and equal to or smaller than about 98 nm. As the thickness d11' of the fifth oxide layer OL5 increases compared to the thickness d11 of the fifth oxide layer OL5 shown in FIG. 3, the adhesion of the fifth oxide layer OL5 with respect to the protective layer PL may increase.

Referring to FIGS. 3 and 4, the windows WM and WM-1 may include the first, second, third, fourth, and fifth nitride layers NL1, NL2, NL3, NL4, and NL5 and the first, second, third, fourth, and fifth oxide layers OL1, OL2, OL3, OL4, and OL5 alternately stacked with the first, second, third, fourth, and fifth nitride layers NL1, NL2, NL3, NL4, and NL5 on the base layer BL, and thus, the windows WM and WM-1 may have high mechanical strength while having low reflectance. Accordingly, the display device DD including the windows WM and WM-1 may have increased display efficiency and increased durability.

Embodiments of the present disclosure provide a window which may be used in a flexible display device in which the likelihood of the window being deformed due to, for example, a folding or bending operation, or being damaged due to, for example, an external impact, is decreased.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A window, comprising:

a base layer;

a plurality of nitride layers disposed on the base layer;

a plurality of oxide layers disposed on the base layer;

a protective layer disposed on the nitride layers and the oxide layers and an intermediate layer disposed under the protective layer, wherein a sum of thicknesses of the nitride layers and thicknesses of the oxide layers is equal to or greater than about 500 nm and equal to or smaller than about 900 nm, the nitride layers comprise first, second, third, fourth, and fifth nitride layers, the oxide layers comprise first, second, third, fourth, and fifth oxide layers, the first nitride layer, the first oxide layer, the second nitride layer, the second oxide layer, the third nitride layer, the third oxide layer, the fourth nitride layer, the fourth oxide layer, the fifth nitride layer, and the fifth oxide layer are sequentially stacked on the base layer, the intermediate layer is disposed between the fifth oxide layer and the protective layer, and the intermediate layer comprises columnar $SiO_2$.

2. The window of claim 1, wherein each of the nitride layers comprises $Si_3N_4$, and each of the oxide layers comprises $SiO_2$.

3. The window of claim 1, wherein the nitride layers have a refractive index greater than a refractive index of the oxide layers.

4. The window of claim 1, wherein a sum of thicknesses of the first to the fifth nitride layers is smaller than about 500 nm.

5. The window of claim 1, wherein a maximum value of thicknesses of the first to fifth nitride layers is smaller than about 300 nm.

6. The window of claim 1, wherein each of the first to fifth oxide layers comprises planar $SiO_2$.

7. The window of claim 1, wherein the intermediate layer has a thickness equal to or greater than about 10 nm and equal to or smaller than about 30 nm.

8. The window of claim 1, wherein the protective layer comprises a polymer comprising fluorine.

9. The window of claim 1, wherein the base layer comprises a glass or a polymer.

10. The window of claim 1, wherein the protective layer has a thickness equal to or greater than about 10 nm and equal to or smaller than about 40 nm.

11. A window, comprising:

a base layer;

first, second, third, fourth, and fifth nitride layers disposed on the base layer;

first, second, third, fourth, and fifth oxide layers disposed on the base layer;

a protective layer disposed on the first to fifth nitride layers and the first to fifth oxide layers; and an intermediate layer disposed between the fifth oxide layer and the protective layer, wherein the first nitride layer, the first oxide layer, the second nitride layer, the second oxide layer, the third nitride layer, the third oxide layer, the fourth nitride layer, the fourth oxide layer, the fifth nitride layer, and the fifth oxide layer are sequentially stacked on the base layer, and the intermediate layer comprises columnar $SiO_2$.

12. The window of claim 11, wherein the first to fifth nitride layers comprise $Si_3N_4$, and the first to fifth oxide layers comprise $SiO_2$.

13. A display device, comprising:

a display module; and a window disposed on the display module, the window comprising:

a base layer disposed on the display module;

a plurality of nitride layers disposed on the base layer;

a plurality of oxide layers disposed on the base layer;

a protective layer disposed on the nitride layers and the oxide layers; and an intermediate layer disposed between the protective layer and an uppermost one of the oxide layers, wherein the intermediate layer comprises columnar $SiO_2$, and wherein the nitride layers are alternately stacked with the oxide layers on the base layer.

14. The display device of claim 13, wherein each of the nitride layers comprises $Si_3N_4$, and each of the oxide layers comprises $SiO_2$.

15. The display device of claim 13, wherein the nitride layers comprise first, second, third, fourth, and fifth nitride layers, the oxide layers comprise first, second, third, fourth, and fifth oxide layers, and the first nitride layer, the first oxide layer, the second nitride layer, the second oxide layer, the third nitride layer, the third oxide layer, the fourth nitride layer, the fourth oxide layer, the fifth nitride layer, and the fifth oxide layer are sequentially stacked on the base layer.

* * * * *